United States Patent
Stacy et al.

(10) Patent No.: US 10,140,582 B2
(45) Date of Patent: *Nov. 27, 2018

(54) SYSTEMS AND METHODS OF COGNITIVE PATTERNS KNOWLEDGE GENERATION

(71) Applicant: Aptima, Inc., Woburn, MA (US)

(72) Inventors: E. Webb Stacy, Andover, MA (US); Alexandra Geyer, Winchester, MA (US)

(73) Assignee: APTIMA, INC., Woburn, MA (US)

( * ) Notice: Subject to any disclaimer, the term of this patent is extended or adjusted under 35 U.S.C. 154(b) by 199 days.

This patent is subject to a terminal disclaimer.

(21) Appl. No.: 14/738,908

(22) Filed: Jun. 14, 2015

(65) Prior Publication Data

US 2015/0286956 A1 Oct. 8, 2015

Related U.S. Application Data

(63) Continuation of application No. 13/052,543, filed on Mar. 21, 2011, now Pat. No. 9,058,561.

(60) Provisional application No. 61/316,015, filed on Mar. 22, 2010.

(51) Int. Cl.
| | | |
|---|---|---|
| *G06N 99/00* | (2010.01) | |
| *G06N 5/02* | (2006.01) | |
| *G06N 5/04* | (2006.01) | |

(52) U.S. Cl.
CPC ........... *G06N 99/005* (2013.01); *G06N 5/022* (2013.01); *G06N 5/047* (2013.01)

(58) Field of Classification Search
CPC .............................. G06N 99/005; G06F 15/18
See application file for complete search history.

(56) References Cited

U.S. PATENT DOCUMENTS

| | | | |
|---|---|---|---|
| 5,258,855 A | 11/1993 | Lech et al. | |
| 7,266,532 B2 * | 9/2007 | Sutton | H04L 29/06 706/12 |
| 2007/0179918 A1 | 8/2007 | Heisele et al. | |
| 2008/0091628 A1 | 4/2008 | Srinivasa et al. | |
| 2009/0310854 A1 | 12/2009 | Mei et al. | |

(Continued)

OTHER PUBLICATIONS

"Conceptual blending, form and meaning", Gilles Fauconnier, and Mark Turner. Recherches en communication, No. 19, 2003, pp. 57-86.*

(Continued)

*Primary Examiner* — Luis A Sitiriche
(74) *Attorney, Agent, or Firm* — John J. Brooks, III

(57) ABSTRACT

A processor based system and method of generating cognitive pattern knowledge of a sensory input is disclosed. The method comprising the steps of receiving sensory input to create at least one concrete pattern, receiving at least one abstract pattern comprising abstract segments and vertically blending the concrete pattern with the abstract pattern by selectively projecting abstract segments to create a vertically blended pattern whereby the vertically blended pattern represents cognitive pattern knowledge of the sensory input. In some embodiments, the systems and methods further comprise creating a measure of a degree of vertical blending and when the measure of the degree of vertical blending exceeds a threshold, horizontally blending at least two abstract patterns to create a horizontally blended abstract pattern.

20 Claims, 9 Drawing Sheets

(56) References Cited

U.S. PATENT DOCUMENTS

2010/0027895 A1     2/2010    Noguchi et al.
2011/0231349 A1     9/2011    Stacy et al.

OTHER PUBLICATIONS

M. Bar, K.S. Kassam, A.S. Ghuman, J. Boshyan, A.M. Schmide, A.M. Dale, M.S. Hamelainen, K. Marinkovic, D.L. Schacter, B.R. Rosen and E. Halgren, "Top-down facilitation of visual recognition", Proceedings of the National Academy of Sciences of the United States of America, Jan. 10, 2006, vol. 103, No. 2, pp. 449-454, 6 pgs., USA.

Lawrence W. Barsalou, "Simulation, situated conceptualization, and prediction", Philosophical Transactions of The Royal Society, May 2009, vol. 364, No. 1521, pp. 1281-1289, 9 pgs., United Kingdom.

S. Coulson, G. Fauconnier, "Fake Guns and Stone Lions: Conceptual Blending and Privative Adjectives", In B. Fox, D. Jurafsky, & L. Michaelis (Eds.) Cognition and Function in Language. Palo Alto, CA: CSLI, 10 pgs.

G. Fauconnier, Conceptual Integration, In Emergence and Development of Embodied Cognition (EDEC 2001), 7 pgs.

M. Turner, G. Fauconnier, "Conceptual Integration Networks", In Cognitive Science, 22(2) 1998, pp. 133-187, 72 pgs.

M. Turner, "Double-Scope Stories", In Narrative Theory and the Cognitive Science, David Herman (ed.), CSLI Publications, 2003, 26 pgs.

Mai T. Tran, Office Action Summary for parent U.S. Appl. No. 13/052,543, filed Mar. 21, 2011, dated Jan. 31, 2014, 13 pgs., USPTO.

Mai T. Tran, Office Action Summary for parent U.S. Appl. No. 13/052,543, filed Mar. 21, 2011, dated Oct. 22, 2014, 17 pgs., USPTO.

Mai T. Tran, Notice of Allowability for parent U.S. Appl. No. 13/052,543, filed Mar. 21, 2011, dated Jan. 28, 2015, 13 pgs., USPTO.

\* cited by examiner

| Abstract Pattern | Concrete Pattern |
|---|---|
| Type | Token |
| Class | Instance |
| Parameter | Value |
| Contextual Knowledge | Sensory Data |

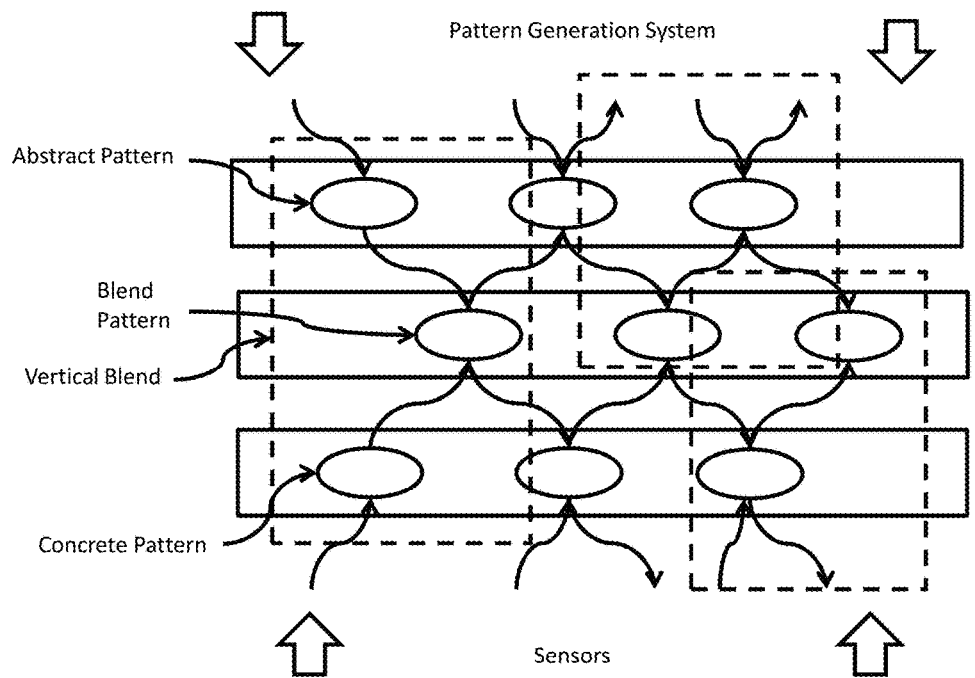
FIG. 6
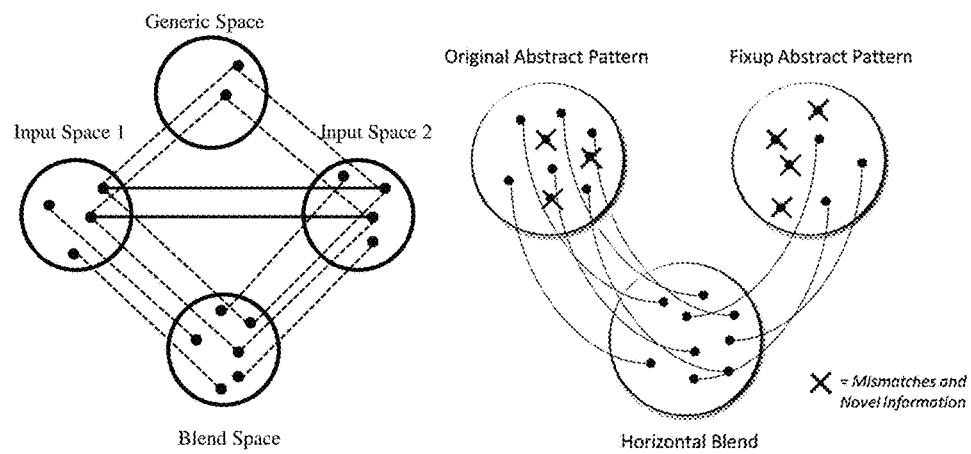
FIG. 7A   FIG. 7B

SYSTEMS AND METHODS OF COGNITIVE PATTERNS KNOWLEDGE GENERATION

CROSS-REFERENCE TO RELATED APPLICATIONS

This application is a continuation application of pending U.S. patent application Ser. No. 13/052,543 filed on 21 Mar. 2011 entitled "SYSTEMS AND METHODS OF COGNITIVE PATTERNS KNOWLEDGE GENERATION"; U.S. patent application Ser. No. 13/052,543 is a non-provisional application of and claims the benefit of U.S. patent application Ser. No. 61/316,015 filed on 22 Mar. 2010 entitled "SYSTEMS AND METHODS OF COGNITIVE PATTERNS KNOWLEDGE GENERATION"; and the entire contents of the above applications are herein incorporated by reference.

STATEMENT REGARDING FEDERALLY SPONSORED RESEARCH OR DEVELOPMENT

This invention was made with Government support under Contract #W31P4Q-09-C-0454 and awarded by the US Army. The Government has certain rights in the invention.

REFERENCE TO SEQUENCE LISTING, A TABLE, OR A COMPUTER PROGRAM LISTING COMPACT DISC APPENDIX

Not Applicable

BACKGROUND OF THE INVENTION

This invention relates to processor based knowledge generation systems.

BRIEF SUMMARY OF THE INVENTION

Systems and methods of Cognitive Patterns Knowledge Generation (CKPG) are a knowledge based systems and methods that can understand, adapt to, and intelligently act in novel situations that are not accounted for by an initial knowledge base, and can do so with minimal, if any external updates to the knowledge base. CPKG systems and methods have the ability to connect to various knowledge based models, sensors, and to a user. The CPKG system is an adaptive system uniquely combining and adding to theoretical concepts in Cognitive Science, such as Fauconnier & Turner's (2002) Conceptual Blending, Barsalou's (2006) Dynamically Interpreted Perceptual Symbol Systems, and Bar's (2006) model of the human eye-brain visual system.

In one embodiment, a CPKG system comprises three major internal components: Pattern Generation, Perception/Action, and Adaptation, which enable it to create situationally-relevant abstract patterns, match sensory input to a suitable abstract pattern in a multilayered top-down/bottom-up fashion (similar to the mechanisms used for visual perception in the brain), and generate new abstract patterns. The CPKG system is designed to accept data from a wide variety of knowledge-based systems (referred to as Long Term-Memory (LTM) models in this description), ranging from the Semantic Web-based ontologies to cognitive models such as ACT-R (Department of Psychology at Carnegie Mellon University) or Soar (University of Michigan) to neuroscientific models of the brain, as well as to one or more sensors providing real-time input to the CPKG system, and to a human operator. Integrating the CPKG system with a processor based device such as a robot and a knowledge representation model (in this case, based on a human long-term memory) can result in a class of devices that demonstrate a high flexibility in decision making and minimize the need for human effort and intervention.

I some embodiments, the CPKG system provides a system of goal-oriented concepts, possibly temporary, that is built from longer lasting taxonomic categories in LTM. These concepts are used for perceptual and motor activities in the robots and robot teams, and provide a mechanism to create new concepts when new information is encountered that cannot be easily accommodated by the existing concepts in LTM. It will be designed to work with a variety of instantiations of LTM, ranging from cognitive models to neuroscientific models to actual human LTM.

It is an object of one embodiment of the invention to provide a processor based method of generating cognitive pattern knowledge comprising the steps of receiving at least one concrete pattern, receiving at least one abstract pattern comprising abstract features and vertically blending the concrete pattern with the abstract pattern to create a vertically blended pattern whereby the vertically blended pattern represents a pattern knowledge of a sensory input. In some embodiments, the concrete pattern comprises one or more parameter representing a sensory input. In some embodiments, the abstract pattern comprises one or more parameter representing a relevant abstract pattern comprising one or more parameter communicated from a long-term memory. In some embodiments, the vertical blending comprises selectively projecting a parameter of the abstract pattern with a parameter of the concrete pattern.

In some embodiments, the method further comprises creating a measure of a degree of vertical blending and when the measure of the degree of vertical blending exceeds a threshold, horizontally blending at least two abstract patterns to create a horizontally blended abstract pattern by selectively projecting at least one abstract parameter from the at least two abstract patterns.

It is another object of one embodiment of the invention to provide a cognitive pattern knowledge generating system comprising a pattern generation module configured to generate an abstract pattern and to generate a concrete pattern from a sensory input and a perception and action module configured to match the abstract and concrete patterns whereby the abstract pattern represents pattern knowledge of the sensory input. In some embodiments, the perception and action module is further configured to vertically blend the abstract and concrete pattern to create a vertically blended abstract pattern. In some embodiments, the cognitive pattern knowledge generating system further comprises an adaptation module configured to horizontally blend at least two abstract patterns to create a horizontally blended abstract pattern. And in some embodiments, the horizontally blended abstract pattern is communicated to a memory as a new abstract pattern.

It is another object of one embodiment of the invention to provide a machine-readable media encoded with instructions, that when executed by a processor, causes the processor to carry out a process for generating cognitive pattern knowledge, the process comprising receiving at least one concrete pattern, receiving at least one abstract pattern comprising abstract features and vertically blending the concrete pattern with the abstract pattern to create a vertically blended pattern whereby the vertically blended pattern represents a pattern knowledge of a sensory input. In some embodiments, the process further comprises creating a measure of a degree of vertical blending and when the measure of the degree of vertical blending exceeds a threshold, horizontally blending at least two abstract patterns to create a horizontally blended abstract pattern.

BRIEF DESCRIPTION OF THE SEVERAL VIEWS OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 6 illustrates conceptual blending basics using concrete and abstract patterns;

FIGS. 7A and 7B illustrate examples of the concept of blending;

DETAILED DESCRIPTION OF THE INVENTION

Systems and Methods of Cognitive Patterns Knowledge Generation (CPKG) will now be described in detail with reference to the accompanying drawings. Notwithstanding the specific example embodiments set forth below, all such variations and modifications that would be envisioned by one of ordinary skill in the art are intended to fall within the scope of this disclosure.

It is one thing to be able to exploit a knowledge base describing possible missions and capabilities. It is quite another to use a knowledge-based system that can understand, adapt to, and act on novel situations that were never envisioned by the knowledge base implementers. The CPKG system can accomplish those things.

It is one thing to recognize objects, it is a different thing to use degrees of recognition to create knowledge that can be used for later object recognition.

Figure 1:
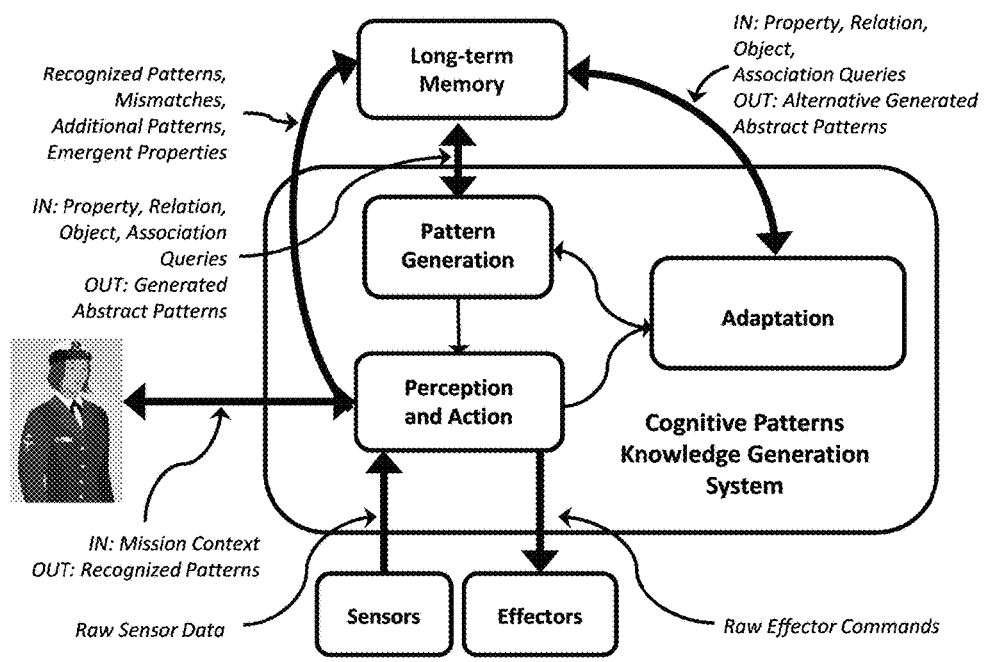
FIG. 1 illustrates a functional view of one embodiment of a CPKG system within a Knowledge-Based System.

For illustration and not for limitation, FIG. 1 illustrates the functional elements of one embodiment of a CPKG system connected to multiple external entities to create a Knowledge-Based System (KBS). Examples of three external entities shown include a Long-Term Memory (LTM), one or more Sensors, one or more Effectors and a recipient. The LTM interacts with the CPKG pattern generation module and the adaptation module to produce abstract patterns. The Sensors provide real-time input to the CPKG system, and one or more Effectors providing a means for the system to act. The recipient, such as a human can interact with the reporting.

Figure 2:
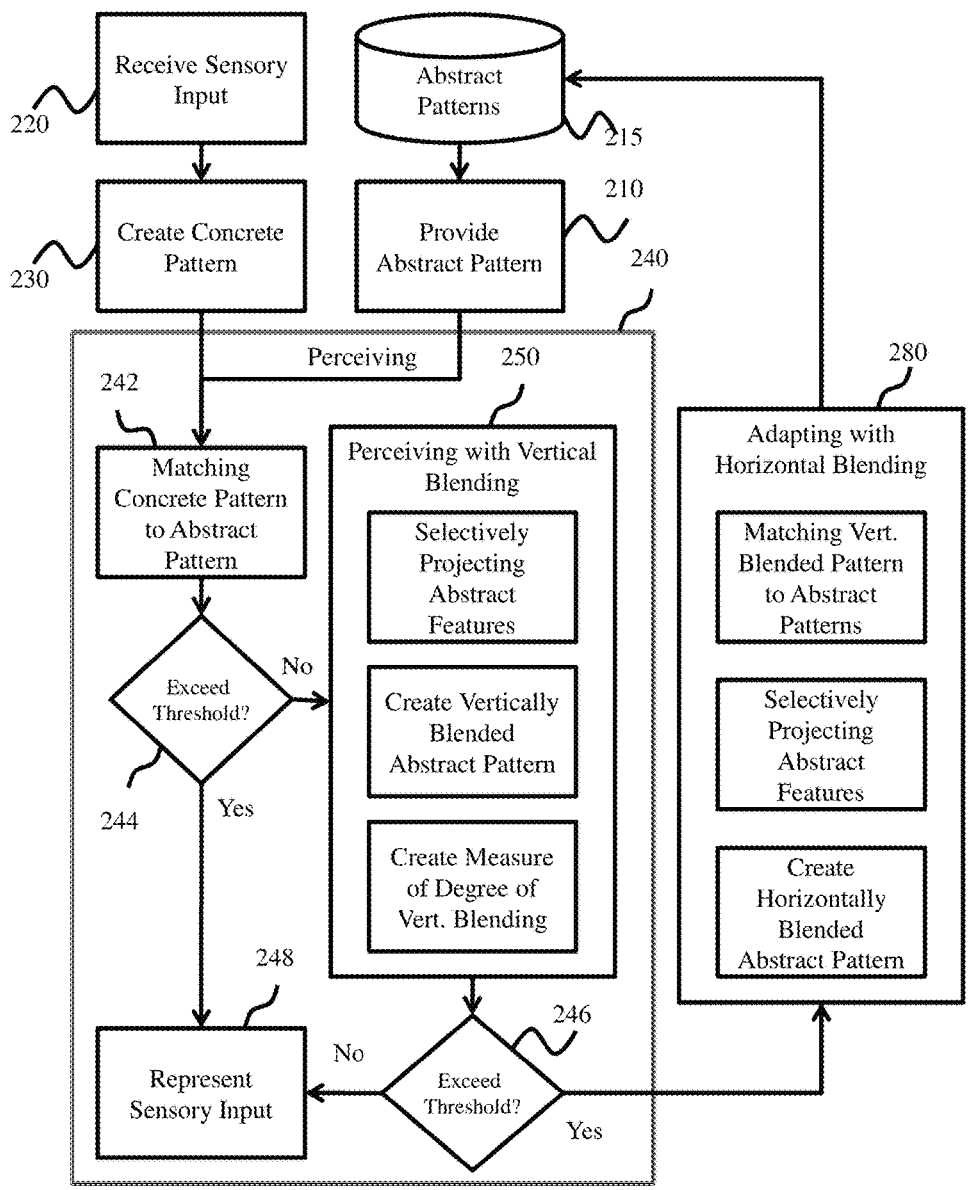
FIG. 2 illustrates a process diagram of one embodiment of methods to generate cognitive pattern knowledge.

One Embodiment of Methods of Generating Cognitive Pattern Knowledge:

One method of generating cognitive pattern knowledge includes the general steps as shown in FIG. 2.

Step 210 comprises providing at least one abstract pattern comprising abstract features. This step includes interacting with at least one pattern from a plurality of patterns that can be retrieved from patterns stored in long-term memory (LTM) to create a situationally-relevant abstract pattern. An abstract pattern is similar to Fauconnier's (2003) notion of a "mental frame" and Barsalou's (2004) concept of "simulation" in that it represents a generalized understanding of the situation. Abstract patterns may range in complexity from a single category such as HOUSE or DOG (Rosch & Mervis, 1975; Lakoff, 1987) to an elaborate script that might describe expected behavior in a restaurant (Schank, 1995). The generalized understanding can be made more concrete by associating situational specifics with portions of the pattern. For example, a DOG pattern becomes more specific as we learn it has brown fur and weighs 40 pounds, and a restaurant pattern becomes more specific as we associate specific people with roles such as host, waitperson, chef, and so on. An important characteristic of abstract patterns is that they can be constructed on the fly as the situation demands. Existing, common concepts in LTM are easily available, but in more unusual cases, for more unusual goals, they do not exist permanently in the knowledge system but are constructed from the information stored in the system. In this, they are similar to Barsalou's (2005) Perceptual Symbol Systems. The construction process is managed by the pattern generation module, and the result is fed to the perception and action module.

Step 220 comprises receiving sensory input and creating at least one concrete pattern at Step 230. Sensory input as used herein means any type of input provided to these systems or methods. For example and not for limitation, sensory input may be data provided by a video sensor, a heat sensor, a audio sensor or a communication device. A concrete pattern as used herein means an interpretation of sensor data into any type of features or characteristics.

Step 240 comprises perceiving the sensory input, represented as a concrete pattern, with a suitable abstract pattern. As shown, perceiving can include several sub-steps the first of which includes matching the concrete pattern from the sensory input to a suitable abstract pattern using a perceptual system at 242. The perceptual system uses a multilayered top-down/bottom-up fashion, similar to the mechanisms used for visual perception in the brain (as, for example, described by Bar, 2007). The abstract patterns from 210 and their derivates take the form of hypotheses that may be matched/tested against sensory data. When the abstract and concrete patterns are matched, shown as step 242, if the matching is identical (a threshold is exceeded at step 244), the concrete pattern of step 230 is bound to the abstract pattern of step 210 and that abstract pattern is used to represent the concrete pattern and corresponding sensory input at step. However, if the matching is not identical, the parameters of the concrete and abstract patterns can also be matched. This matching is performed using a vertically blending approach to match the concrete pattern with the abstract pattern by selectively projecting abstract parameters to match concrete parameters to create a vertically blended pattern including at least the matched parameters.

As used herein a parameter is any type of feature or characteristic used to define a pattern. A bound parameter is used to define when a parameter is matched in both an abstract and concrete pattern. An unbound parameter is used to define those parameters that are only found in one of a concrete pattern or abstract pattern. Selective projection is taking those bound or matched parameters and projecting them into a blended pattern. Although selective projection includes taking the bound/matched parameters into the blended pattern, that does not preclude the blended pattern from tracking or sometimes including unbound parameters. It is also understood that defining bound and unbound parameters does not only include the binary matching of parameters, but it also includes the matching of parameters based on probabilities and may include the matching of multiple parameters based on multiple probabilities.

Figure 11:
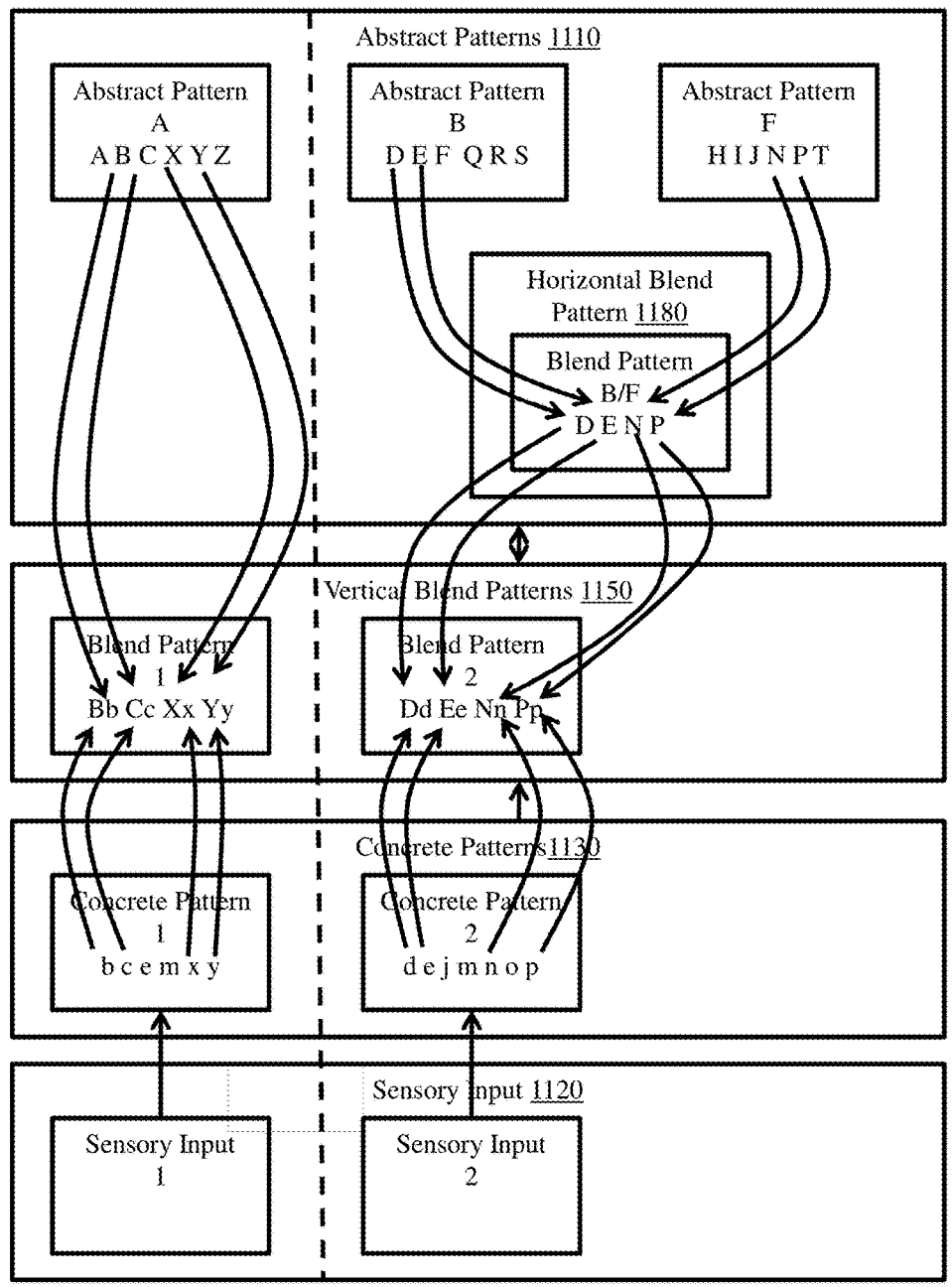
FIG. 11 illustrates one high-level example of vertical and horizontal blending.

An example of vertical blending can be shown in FIG. 11. FIG. 11 shows abstract patterns 1110 and concrete patterns 1130 derived from sensory input 1120. Referring to vertically related Abstract Pattern A and Concrete Pattern 1, Abstract Pattern A includes features of A, B, C, X, Y and Z and Concrete Pattern 1 includes features b, c, e, m, x and y from Sensory Input 1. When Abstract Pattern A and Concrete Pattern 1 are compared to see if parameters can be bound, the B of the Abstract Pattern A is matched and bound to the b of the Concrete Pattern 1. These bound parameters are then projected in to the Blend Pattern 1. Binding other features found in both patterns such as C to c, X to x and Y to y creates the other selectively projected parameters of Blend Pattern 1. This vertically blended pattern represents a match of a majority of the Concrete Pattern 1 parameters and the Abstract Pattern A parameters. This Blend Pattern 1 is then used to represent the Concrete Pattern 1 which in turn represents Sensory Input 1.

Another example of vertical blending can be illustrated by supposing that a relevant abstract pattern, as described above, is DOG. This abstract pattern is derived from knowledge retained in memory such as a LTM and includes many different parameters such as COLOR, HEIGHT, NUMBER OF LEGS, TAIL-WAGGING and SHAPE of a DOG. Sensory input is provided that is translated to parameters in a concrete pattern of (1) an item shaped like a dog, (2) certain rapid motion similar to a tail wagging and a (3) round object. When the abstract patterns of DOG is tested against the concrete pattern, this perceiving step can hypothesize that what is sensed by the sensor is a DOG because (1) and (2) match the pattern of a DOG. Item (3) could be something not associated with the DOG such as a basketball.

Referring back to FIG. 2, at Step 248, a vertically blended pattern can be used to represent cognitive pattern knowledge of the abstract pattern and sensory input. Although not required, the blended pattern can be used to update system knowledge by storing the pattern as another abstract pattern in memory such as LTM.

Although not shown, a step of providing a response based on the perception of the sensory input, and action, can be added as output to this method. This could result in a system and methods that provide an action based on the perceived sensory input. For example and not for limitation, this could result in a system that is able to take top-level sensory input (commands) such as "Explore the room to the north" or "Guard the exit" are perceived and translated into lower level commands, eventually resulting in primitive commands such as "Advance the left track or Determine distance to wall" to the effector system, such and a robot's locomotion system.

The perceiving step at 240, utilizing a perception and action module, matches using the process of vertical blending that allows for partial matches between abstract and concrete (sensory) patterns (e.g. sensory pattern only partially matches an abstract pattern), that can record mismatches (e.g. sensory pattern does not match any of the abstract patterns).

In some cases, the perceiving with vertical blending steps will not be able to construct an abstract pattern that matches the sensory data sufficiently. This is shown in FIG. 2 as comparing the threshold (step 246) of the measure of degree of vertical blending (in step 250). This might be the case, for example, on encountering a new kind of animal that has some, but not all, features of a dog, or on encountering an enemy robot with a previously unknown capability. This situation is recognized in the subelement of step 250 where a measure can be taken representing the degree of vertical blending that is necessary to construct the abstract pattern. In step 246, this measure is compared to a threshold and if this measure is exceeded, reflecting a poor match by vertical blending, the CPKG system will generate a new abstract pattern by combining selected parameters of other constructible abstract patterns though the steps of 280. For example, if an animal appears to be a dog but has the neck of a giraffe, adapting will create an abstract pattern that might be called a dograffe; and it might understand the new enemy robot capability by combining the abstract pattern for the enemy robot with a different abstract pattern for insurgent tactics. As shown in step 280, this adapting is performed with horizontal blending that uses selective projection of multiple abstract parameters to create new horizontally blended patterns. Horizontal blends get their name from the fact that the patterns being blended are at approximately the same level of abstraction. These are most similar to Fauconnier & Turner's (2002) double scope blends. The result of the horizontal blending process is a new abstract pattern, and this can be provided either to the pattern generation system or to LTM.

A simplified example of horizontal blending is shown in FIG. 11 utilizing the vertically related Abstract Pattern B, Sensory Input 2 and resulting Concrete Pattern 2. Assuming that Abstract Pattern B represents the relevant abstract pattern to be applied to Sensory Input 2. When this matching is done, only the parameters of D and E are matched with d and e respectively. This is not a very high percentage match and for this example we will assume that it does not meet the threshold of vertical blending and requires horizontal blending. For this example then, multiple abstract patterns are used to create a horizontally blended pattern. The D and E of Abstract Pattern B can be used in a blend (shown in the Horizontal Blend Pattern). Across the plurality of abstract patterns, an abstract pattern is selected for horizontal blending. In one embodiment, the abstract patterns selected for blending are those abstract patterns that have the highest percentage of or absolute matching of parameters to the concrete pattern. In this case, Abstract Pattern F is found to include N and P which can be bound with parameters n and p of Concrete Pattern 2. Blending Pattern B and F can create Blended Pattern B/F where parameters D, E, N and P can be bound with Concrete Pattern 2. This new Blended Pattern B/F can then be added to the pool of abstract patterns, expanding the knowledge of the patterns and allowing Concrete Pattern 2 to be represented by that new blend. It is understood that although only two abstract patterns are used in this example, it is possible to have multiple abstract patterns with multiple parameters blended into a horizontally blended pattern.

Referring again to FIG. 2, the new abstract pattern from step 280 is added to abstract patterns of 215 that now can be used to match with the sensory input and resulting concrete pattern. Because this new abstract pattern will be provided at step 210, it is expected that the matching of step 242 will provide a pattern match that meets the threshold of 244 and results in a perceived representation at step 248.

The result of this process is a best-guess perception of the situation represented by the sensory input, suitable for action or reporting such as to a human operator. With this approach, when sensory data does not exactly match the abstract pattern but the abstract pattern is not rejected outright, data describing the mismatches and any emergent properties are adapted to create new abstract patterns that can be used for later perception.

Embodiments of these methods can also be combined with other external components such as LTM, Sensors, output devices and other systems to include a User to create embodiments of a Knowledge-Based System (KBS). Through interaction with these components, the CPKG receives information from a sensor and use that information to update LTM or create an action such as move a device.

Additionally, a trace of the activity of-the perception and action module can be sent to other components of the knowledge-base system such as LTM.

One Embodiment of a System for Generating Cognitive Pattern Knowledge:

As will be readily apparent to those skilled in the art, the present invention can be realized in hardware, software, or a combination of hardware and software. Any kind of process based system, such as computer/server(s), or other apparatus adapted for carrying out the methods described herein, is suited. A typical combination of hardware and software could be a general-purpose computer system with a computer program that, when loaded and executed, carries out the respective methods described herein. Alternatively, a specific use computer, containing specialized hardware for carrying out one or more of the functional tasks of the invention, could be utilized.

Figure 10:
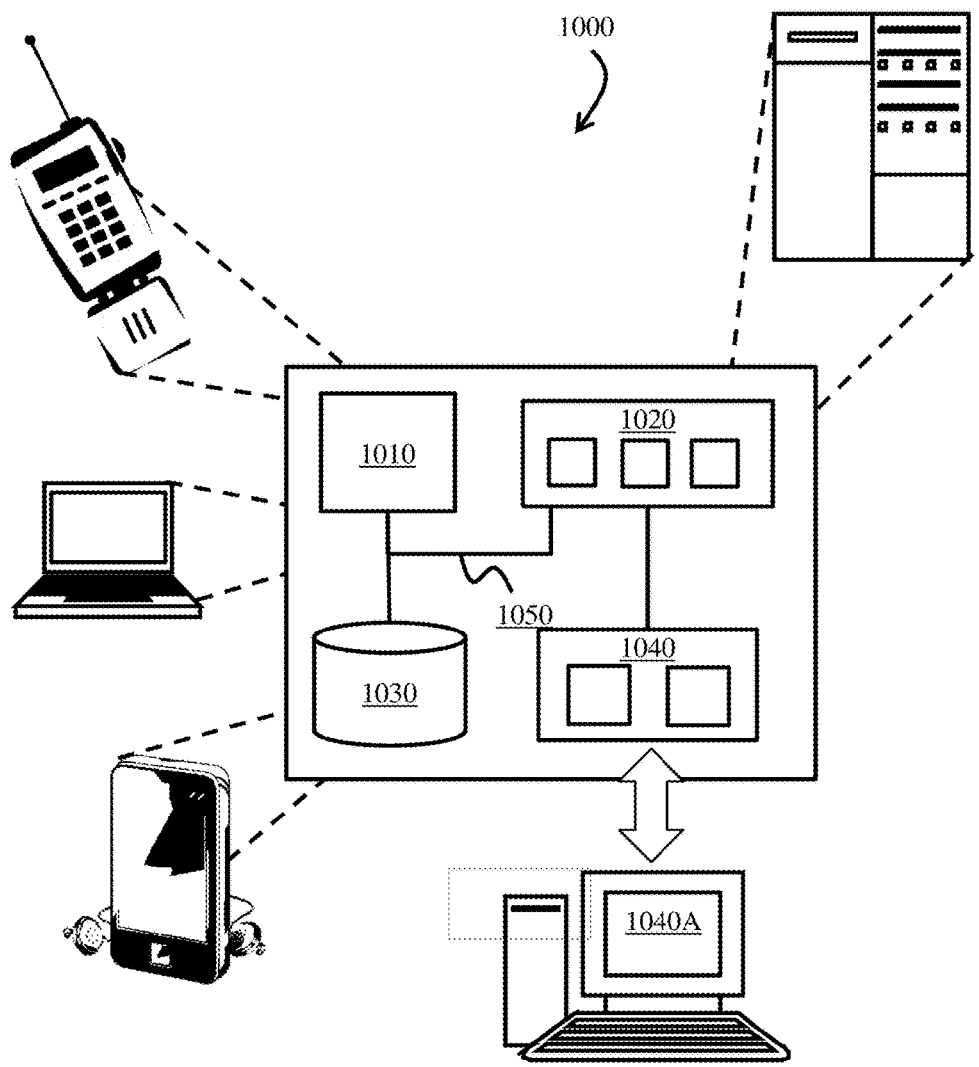
FIG. 10 illustrates one embodiment of a processor based CPKG system.

The various method embodiments of the invention will be generally implemented by a computer executing a sequence of program instructions for carrying out the steps of the methods, assuming all required data for processing is accessible to the computer, which sequence of program instructions may be embodied in a computer program product comprising a non-transitory computer-readable medium storing the program instructions. The term non-transitory computer-readable media or medium comprises all computer-readable media or medium with the sole exception of a transitory, propagating signal. A processor-based system 1000 is depicted in FIG. 10 herein by which the method of the present invention may be carried out. Computer system 1000 includes a processing unit, which houses a processor 1010, memory 1030 and other systems components that implement a general purpose processing system or computer that may execute a computer program product comprising medium, for example a compact storage medium such as a compact disc, which may be read by processing unit through a disc drive, or any means known to the skilled artisan for providing the computer program instructions to the general purpose processing system for execution thereby. The program instructions may also be stored on media such as hard disk drives within processing unit or may be located on a remote system such as a server, coupled to processing unit, via a network interface, such as an Ethernet interface. Monitor, mouse and keyboard can be coupled to processing unit to provide user interaction. A scanner and printer can be provided for document input and output.

The present invention, or aspects of the invention, can also be embodied in a computer program product, which comprises all the respective features enabling the implementation of the methods described herein, and which—when loaded in a processor-based system is able to carry out these methods. Computer program, software program, program, program instructions or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

Figure 3A:
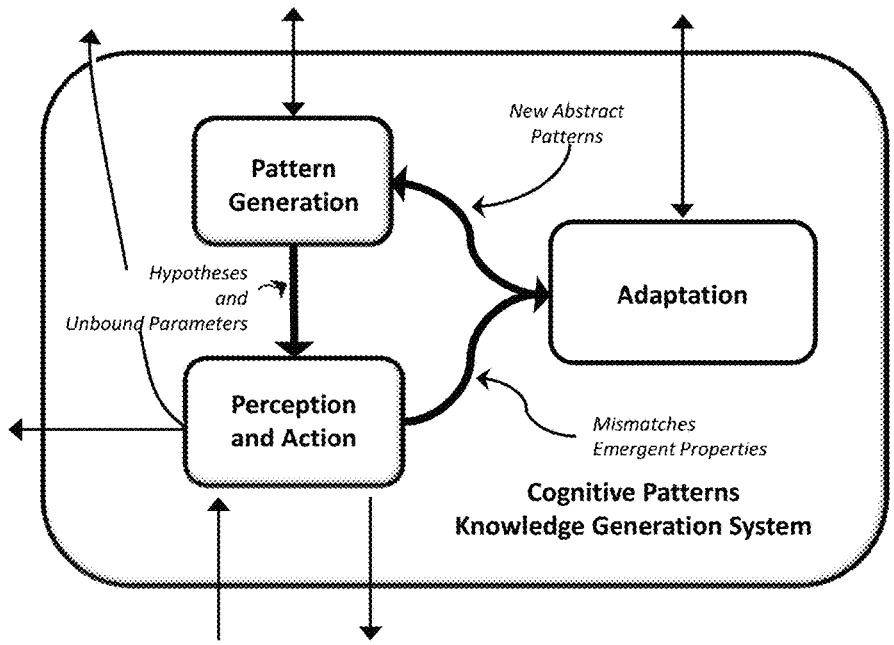
FIG. 3A illustrates a functional view of one embodiment of modules and their functional interconnection in an illustrative CPKG system.
Figure 3B:
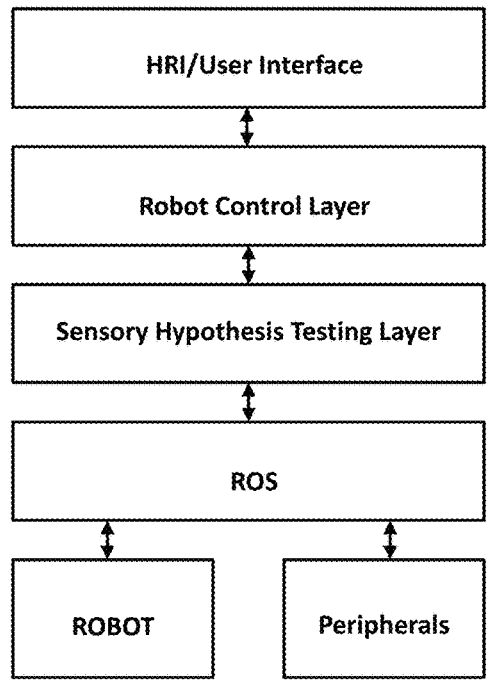
FIG. 3B illustrates one embodiment of a structure of the computer program instructions.

As illustrated functionally in FIG. 3B, the computer program instructions can be structured to provide user interfaces and operations interfaces to physical components such as ROBOT and Peripherals. As shown, there are six components for one embodiment of a software architecture. The human-robot interface (HRI) layer controls and displays information to the human operator and accepts and passes data from the user to other processing tiers. The robot control layer contains the high-level processing and decision-making logic and will contain the CPKG processing modules. This layer involves pattern recognition, perception and action generation, and adaptation modules as described above. The sensory hypothesis testing layer converts hypotheses from the robot control layer into a form in which they can be tested against sensory data, conducts the tests, and communicates the results to the robot control layer. This is the module that must match sensory data against expectations, and the results of these matches allow the robot control layer to make decisions about patterns and adaptation. ROS is an open-source, meta-operating system for robots. A suitable ROS for one embodiment is one that is built off of the work from the Player-Stage project (http://ros.org.) which is an open-source, meta-operating system for robots. It allows our high-level control logic to be hardware/robot agnostic. The ROS layer provides a hardware abstraction layer that decouples the hardware-specific components from the rest of our system. In these embodiments, pieces of hardware or entire robots could be easily exchanged for others without having to rewrite any of the robot's control code, as long as any substitute robot is capable of exposing the same interfaces (e.g., it has a laser, bumper—or whatever is required by the algorithms). For example, if we were to use a Hokuyo laser rangefinder in our initial design but then later decide to go with a SICK LMS200 (a more expensive high-powered laser), we would merely have to change a configuration file in ROS; our control and planning software would not have to be modified at all. This paradigm also supports easy transition from simulation platforms to real robotic platforms. Software and algorithms can be tested in simulation for ease of debugging before being loaded on physical platforms with minimal code changes. The final layers of the architecture are the physical robot and peripheral devices that will be used for experimentation and validation. Suitable robot and peripheral devices include such devices as iRobot Create hardware platforms equipped with laser rangefinders and pan-tilt cameras to explore environments and develop abstract patterns and exercise the adaptation and perception and action modules.

For one embodiment consistent with the structure of FIG. 3B, FIG. 3A shows a Sensory Hypothesis Testing Layer that comprises three major internal modules—Pattern Generation, Perception and Action, and Adaptation. These modules represent interrelated portions of computer program instructions.

Means to generate patterns is performed by the pattern generation module. This module is responsible for interacting with LTM to create the situationally-relevant abstract pattern. The pattern generation process is managed by the pattern generation module, and the result is fed to the perception and action module.

Means to perceive and act is performed by a perception and action module. The perceptual module matches sensory input to a suitable abstract pattern in a multi-layered top-down/bottom-up fashion, similar to the mechanisms used for visual perception in the brain (as, for example, described by Bar, 2007). The perception and action module is also responsible for matching unbound parameters in the pattern with relevant concrete patterns from sensory data. The action module takes top-level command and translates them into lower level commands, eventually resulting in primitive commands to the effector system. Actions are included in the perception and action module because they are intertwined with perception, providing feedback on the results of actions at each level.

The perception and action module uses the novel matching methods of vertical blending as described above.

Means to adapt patterns and create horizontal blends is performed by the adaptation module. The adaptation module generates new horizontally blended abstract patterns when the pattern generation module cannot construct an abstract pattern that matches the sensory data sufficiently. This might be the case, for example, on encountering a new kind of animal that has some, but not all, properties of a dog, or on encountering an enemy robot with a previously unknown capability. In these cases, the CPKG system will generate a new abstract pattern by combining selected aspects of other constructible patterns. For example, if an animal appears to be a dog but has the neck of a giraffe, the adaptation module will create an abstract pattern that might be called a dograffe, and it might understand the new enemy robot capability by combining the abstract pattern for the enemy robot with a different abstract pattern for insurgent tactics. Horizontal blending gets its name from the fact that the patterns being blended are at approximately the same level of abstraction. These are most similar to Fauconnier & Turner's (2002) double scope blends. The result of the horizontal blending process is a new abstract pattern, and this is provided to the pattern generation system for perception and action. The new abstract pattern can also be provided to other system elements such as LTM.

Referring back to FIG. 1, one embodiment of the CPKG system can be connected to three external entities to create embodiments of a Knowledge-Based System (KBS). Described below are examples of the three external entities: LTM, Sensors and a User. An example of a supporting CPKG and KBS software architecture is shown in FIG. 3B.

As shown in FIG. 1, the LTM interacts with the CPKG pattern generation module and the adaptation module to provide and produce abstract patterns. The KBS and the CPKG system are designed to include a wide variety of LTMs embodiments, ranging from the Semantic Web-based ontologies to cognitive models such as ACT-R or Soar to neuroscientific models of the brain to actual human brains. To use any of these, the systems only need to be modified to respond to a specific kind of queries by offering knowledge about parameters, properties, relations, objects, and associations in memory, and optionally to update themselves with information about specific perceived situations, and about mismatches and emergent properties discovered during the process of perception.

For an application program interface (API) to one embodiment of a CPKG system, there will be two basic sets of interactions: those that pose queries to LTM, and those that inform LTM about new knowledge discoveries. Queries will serve two purposes, one for creating vertical blends and the other for creating horizontal blends. For vertical blends, the queries will be fairly prosaic, for example, "Find variants of my current frame that have a small round object in them," or "Find me a list of objects with a whip antenna," or "Find me the top three objects that could match this sensor input, given this general category of frame." For horizontal blends, the goal will be to find new abstract patterns that meet certain requirements or parameters, for example, "Find all the concepts that involve forward motion that has been impeded," or "Find all the concepts that involve objects that can't locate themselves on a map" or "Give me the top 3 concepts that describe concealing a small device." Both kinds of queries can have different levels of granularity and different levels of abstractness, given the range of computational representations of abstract and concrete patterns that can be provided. In addition to querying LTM, however, this embodiment of the CPKG system can update LTM when (a) sensor information doesn't match the concepts in LTM, (b) new horizontal blends are created (that is, when new knowledge is generated), and when (c) new exemplars of those blends are encountered. Some LTM models—for example, the cognitive and neuroscientific models, and humans—will be readily able to modify themselves based on the CPKG system updates, and others—ontologies, in particular—will do so with difficulty. For this reason, modifications to LTM will not be required for CPKG to function. They will simply help it to function better.

Referring again to FIG. 1, one or more sensors provide input to the CPKG system, and one or more effectors provide a means for the system to act. The sensors need not correspond to human senses, but preferably the data they provide can be used by the perception and action module to test pattern hypotheses. There are few constraints on the effectors but in a preferred embodiment their capabilities are known to the LTM system. One class of sensors and effectors is communications from other robots, which may also be equipped with the same or similar CPKG systems. This is helpful for dealing with teams of robots. The process of perception will be almost identical for each sensor: it will simply be a matter of determining which sensor(s) are best to test the hypotheses implicit in the abstract pattern. We do not expect, however, that existing sensors are oriented toward testing hypotheses. Typically, sensors simply pass on the sensed data to higher layers. To address this challenge, software will transform perceptual hypotheses, as provided by the CPKG Perception and Action Module, into a form in which they can be tested against raw sensor data. This also used to define the API between the Sensors/Effectors and CPKG's Perception and Action Module. As with most APIs, interactions between CPKG and the sensor systems can be bidirectional. CPKG will send one or more hypotheses to the sensor systems, and they in return will report the results of that hypothesis test (and possibly additional data that will be useful in the perceptual process). This interface can adapt the abstract and concrete pattern representations to specific sensor hypothesis tests, and provide appropriate representations for hypothesis test results and annotations.

Suitable sensors include, but are not limited to a human-detecting sensor package that includes a visual camera, LIDAR (Light Detection And Ranging), and an infrared camera for thermal (FLIR) imagery. With these peripherals, hot areas can be sensed as white and cool areas are black. The human-detecting sensor package can support both bottom-up and top-down methods for hypothesis generation and verification. For example, the color vision system may inform the CPKG of a possible human target at a specified location, and the CPKG may generate a hypothesis that is tested by the thermal vision system.

A receiver, such as a human, with which to interact, by reporting perceived situations and by accepting and acting upon human-supplied context, such as commander's intent can also interact with this system. A high and low bandwidth mode of communication can allow multiple levels of interaction with operators. One type of interaction can be is the use of gesture based recognition for communication between team members and the CPKG system. For example, in the room clearing environment, low-attention non-verbal control of a robot system is desirable. Deployment environments may have a level of ambient noise prohibitive to traditional communication or may require some degree of silence be maintained between team members. More commonly, an operator's attention and communication efforts may be better directed away from direct robot control, for example, maintaining an awareness of and line of communication with human collaborators. In these situations, a straight-forward non-verbal form of human-robot communication is helpful. Physical gestures are one such means of communication and control. The approaches encompass a variety of sensor techniques. One example approach is to leverage an accelerator-based gesture system that makes use of off-the-shelf Wii Remotes. To command the robot team, an operator simply holds a single button while performing a gesture with the Wii Remote in hand. The acceleration forces that comprise the gesture are communicated to the system via the Wii Remote's Bluetooth networking capabilities. The gesture performance is temporally normalized and its similarity is compared to a pre-existing database of gestures via corollary statistics. Since the acceleration data are rich, very few examples of a gesture are needed to train the system for accurate recognition. This allows the system to support custom ad-hoc gestures trained at runtime.

An Operational Description of One Embodiment of a System for Generating Cognitive Pattern Knowledge:

To illustrate one embodiment of the systems and methods described above, and not for limitation, and example of a robot and human sensing interacting with a populated LTM and several sensors will be used.

The Pattern Generation Module generates abstract patterns. These patterns are not a part of the permanent LTM system, but rather are generated on demand to meet the needs of the rest of the CPKG system. These demands come from ongoing expectations—based on previously recognized aspects of the situation—and involve retrieving objects, object properties, interobject relations, and object associations from LTM. For example, if the perception and action module has determined that there is a brown furry animal that is about 1 foot high in the field of view, the pattern generation module might query LTM for objects that could have such properties, and could ask for additional properties of those objects as well as relations and associations of those objects.

Based on the information returned from LTM, the pattern generation module arranges the results into one or more coherent bundles, each of which is an abstract pattern. The idea is to provide a set of "what if" scenarios to the perception and action module, which will be responsible for discovering how well each scenario matches reality. These scenarios, therefore, provide a rich set of hypotheses to be tested in the perception and action module.

One aspect of the information returned from LTM is that the properties, relations, and associations can have a temporal aspect, that is, they can represent the behavior of the object (and related objects) over time. Barsalou (2006) describes a construct very similar to temporal abstract patterns that he calls simulations, and this is an apt term in the present context.

Abstract patterns do not specify every detail. An abstract pattern representing a dog will not necessarily include a specific fur color or a specific size, and an abstract pattern representing an enemy robot will not necessarily specify its color or weapons capability. Such properties—ones that could be important but that will best filled in by the perception and action module—can be identified, even if they don't have a value, and are called parameters. Thus, a second function of the pattern generation module is to identify important parameters and to provide place-holders for them in the scenario. (These are distinct from sensory information that does not match the scenario—there is a way to deal with such anomalies, which we will discuss shortly.)

Embodiments also address the bootstrap problem. For example, when the pattern generation module is in steady state, the situations and objects in the environment have already been recognized, and provide plenty of fodder for interaction with LTM to generate the next relevant abstract pattern; but when starting up, there are no ongoing expectations in the pipeline. The solution lies in seeding the module with known information such as the mission description and the commander's intent, and with abstract patterns that are sufficiently neutral that they will enable basic situational awareness, and thereby enable a filling-up of the module with situations and objects actually in the environment.

The perception and action module provides a top-down/bottom-up perceptual process. Cognitive Scientists have long known that perception isn't a simple matter of aggregating data from sensors; with situations of even moderate complexity, the process virtually requires knowledge about the situation being perceived in order to process (Bullier, 2001.) This process of making sense of incoming sensory data using knowledge of the situation and context is often called top-down/bottom-up processing because it requires the simultaneous interaction of knowledge and sensory data, rather than being purely bottom-up (i.e., aggregating sensory data) or top-down (i.e., imagining what's there rather than perceiving it.)

Figures 4, 5:
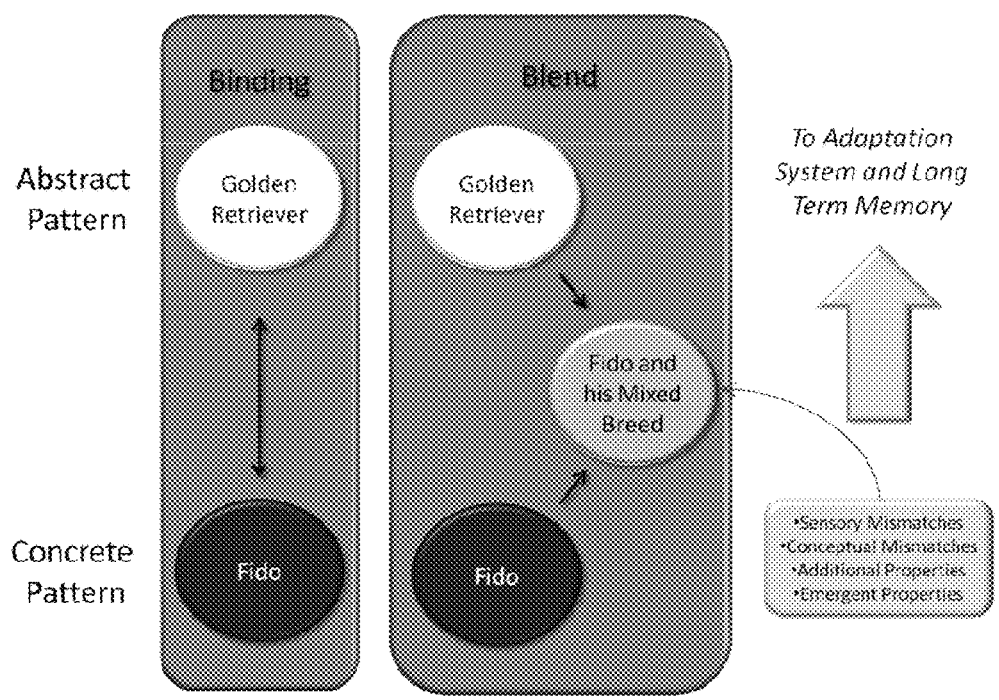
FIG. 4 illustrates a table of examples of abstract and concrete patterns.
FIG. 5 illustrates multi-layer vertical blends in one embodiment of a CPKG system.

The CPKS system also provides a top-down/bottom-up perceptual process by finding full or partial matches of abstract patterns, as constructed from interactions with LTM, with concrete patterns, as provided by incoming sensory data. FIG. 4 shows several different forms that abstract and concrete patterns take. In general, the process of perception is the matching of an abstract pattern to a concrete pattern.

Matching a type to a token or an instance to a class, for example, is a kind of classification, which is an important aspect of perception, namely attaching a symbol to a subset of available sensory data ("I see a dog.") Similarly, assigning a value to a parameter, which here means to certain unspecified aspects of the category, is an equally important aspect of perception ("I see a dog with brown fur.")

Most systems for type-token matching work using a process called binding. Binding involves simple pairing—the type matches the token, the class matches the instance, and so on. This works in simple cases, but unfortunately when the best-matching type does not exactly fit the token, the only choice is to either force the match and ignore the mismatching aspects, or simply ignore the token because it doesn't fit anywhere.

We solve the problem in the CPKG system by adapting a concept from Conceptual Blending (CB; Fauconnier & Turner, 2002). We create a third pattern space into which both the abstract and the concrete pattern may be projected. We call this process vertical blending, because it involves blending a higher-level (abstract) pattern with a lower-level (concrete) pattern.

FIG. 5 illustrates the difference. Suppose we are trying to perceive a dog that is of mixed breed, one of which is a Golden Retriever, one of which is a Dachshund. With a simple binding strategy, we must either identify the dog as a Golden Retriever (or a Dachshund) or we must fail to categorize the dog. With a vertical blend, we can project some, but not all, properties of the Golden Retriever into the blend (and we can do the same with Dachshund properties), and we can even add new properties to the percept that belong to neither breed (or even to dogs, for that matter.) In addition, by using a vertical blend, we can note all anomalies and emergent properties that resulted, and we can feed these back to LTM and to the adaptation module for further action, should it be required. This approach uses perception based on vertical blends rather than bindings.

Perception, of course, is considerably more complicated than arranging the right blend between abstract and concrete patterns; there are many subtleties and nuances that cannot be accommodated by such a simple pairing or blending system. In the brain, the visual system has many layers ranging from very concrete to very abstract; we use this as inspiration for the perception and action module in the CPKG system.

In particular, as we can see in FIG. 6, the terms "abstract" and "concrete" are relative. The idea is that there can be any number of layers, and each layer provides (relatively) abstract pattern hypotheses for the layer below and (relatively) concrete pattern results for the layer above. At the top of the stack of layers is the pattern generation module, which provides a starting place for the abstract patterns; at the bottom are the sensors, providing raw sensor data.

At the very beginning of a situation or mission, the middle layers are seeded with standard sets of patterns to match, and as the mission proceeds, the abstract pattern supplied by the pattern generation system works its way down the stack as the concrete patterns that match the sensory input work their way up. Previous matches and blends directly influence subsequent matches and blends, so that in steady state, information flows both top-down and bottom-up. This model is Bar's (2007) model of the human eye-brain system, except that that model uses simple matching instead of vertical blending. Nevertheless, it is comforting to learn that the brain uses logic similar to that in the Pattern Generation system.

As mentioned above, the action portion of the perception and action module is somewhat simpler in that high-level actions simply get decomposed into lower-level actions; in this regard, it is primarily a top-down system. However, at each level, the perceptual system can generate feedback to the action system, and if the action system isn't behaving as expected, it can take corrective action at that level. For example, if a robot learns from a mid-level perception layer that it is about to tip over while climbing stairs, it can generate an action at that level (say, "regain balance") and act on it without having to involve higher action or perception levels. Of course, if it is sufficiently unsuccessful, higher levels will generate higher-level feedback, and a higher-level course of action will be pursued.

The adaptation module comes into play when the normal pattern generation and perceptual processes are not sufficient to produce a good description of the ongoing situation. This will happen when the situation is novel enough that standard LTM-pattern generation interactions fail. Examples of this would be a confrontation with new problems, new attributes, or new objects in the environment, and we will work though such an example in some detail below.

The adaptation module uses a technique we call horizontal blending, so named because it involves patterns that are generally at the same level of abstraction. Horizontal blending is most similar to the kind of blending described in the CB literature, so we describe aspects of it here.

A central concept in CB is the mental space (Fauconnier, 2003). It is a kind of frame or mental model of some domain, populated by elements such as objects, roles, and scripts. They correspond most closely to what we have been describing as abstract patterns. Mental spaces are connected to LTM, and, according to its proponents, form the basis for the human conceptual system. We use mental spaces to understand and generate ideas, so they are extremely common in human thought. Examples of mental spaces abound: visiting a doctor, operating a machine, falling in love, baseball, boxing, tank maneuvers, air-to-air combat, urban cordon and search, and many, many more. Each of these mental spaces has its own roles, objects, and scripts. For example, in visiting a doctor, there are doctor and patient roles, there are objects such as symptoms and stethoscopes, and there are scripts describing the process of arriving at the office, announcing your presence, waiting to be called, going to an examination room, and so on.

Two or more mental spaces will contribute to a conceptual blend, and these are called input spaces. Sometimes a single mental space serves as both inputs (perhaps at different times), forming blends called mirror blends or single scope blends. Often, however, the input spaces are different. This is a double scope blend, and it is the primary kind of blend used in the perception and action module's horizontal blends. The kind of blend used in the vertical blends of the perception and action module is called a simplex blend.

In creating a blend, there is also a mental space describing the blend itself. This is important because it implies that the blend is an emergent mental space that can have its own unique properties that don't belong to any input space. To complete the picture, there is generic mental space describing abstractions among the elements of the input space, though there is no correlate of this space in either the vertical or the horizontal blends in the CPKG system. The full CB arrangement can be seen in FIGS. 7A and 7B and examples of Conceptual Blending are discussed below.

Imagine that a foreign aid bill has just been passed by Congress, but that the President chooses to veto it. A newspaper editorial wanting to explain their opposition to the veto might have a headline saying, "President snatches rice bowl away from starving children." The headline is an example of conceptual blending. The actual details of the process of developing the foreign aid bill, the bill itself, and the veto process, involving legal semantics, political maneuvering, and bureaucratic procedures, are likely to be opaque and unpersuasive to the newspaper's readers; but most people have an existing concept of children in impoverished settings, and another existing concept that it is cruel to take their food away. In the blend, aspects of the tedious and not-very-graspable legislative process are combined with aspects of the immediately comprehensible starving children vignette, with a result that the newspaper's readers immediately understand the point of view being expressed. The editors have rapidly and accurately conveyed their point of view. (Whether their point of view itself is accurate is another matter, but not one for which CB is relevant.)

Conceptual blending is a pervasive activity in human cognition, so an approach to rapid and accurate transfer of ideas based on CB will have wide applicability. We all use the capability often, regardless of education, intelligence, culture, or personality. The cognitive principles described by CB are the basis of many popular sports stories, advertisements, and jokes that everybody can understand. Consider, for example, a comic strip from the Johnny Hart's B.C. where one caveman character walks up to a cliff and finds a sign saying "Echo out of order." There are several blends involved in the scenario, including one where a caveman exists in a world with signs and one where echoes are mapped to machines that can be out of order. The important blend comes in the next panel, though. The caveman shouts "Hello!" and promptly gets the reply, "Can't you read?" Here, the mental space involving cliffs and echoes is blended with a space where a peevish repairman is annoyed at being interrupted.

Most people laugh when they read the comic strip. It is accessible to all who can read English well enough to understand the sign and the utterances. No special training or skills are required. This is, in general, true about comprehension via CB. Hence, any tool that is able to support the creation of conceptual blends for rapid and accurate idea transfer will be useful for communicating to a wide variety of audiences.

When there are anomalies and emergent properties in a top-level blend identified by the perception and action module, two things can happen. First, a message to that effect is sent to LTM, and it can take whatever steps it can to remember the result. Presumably this won't happen every time there is a minor mismatch, but rather will be triggered by severe and repeated mismatches. When the LTM system is capable, it might even restructure itself accordingly.

Less drastically, the anomalies and emergent properties can serve as a signal that a horizontal blend is required. The adaptation module will interact with LTM in a way similar to the way that the pattern generation module does, except it will be trying to generate an abstract pattern based on the anomalous and emergent information it was fed. As illustrated in FIG. 7B, the process is similar to the way that the pattern generation module works, except it will be trying to generate a "fixup" abstract pattern that may not match the situation but that will be a better match for the novel and mismatched information it was fed. It will then attempt to create a new, third abstract pattern—a horizontal blend—based on the original one and the fixup abstract pattern it has just created. The horizontal blend will take the situation-matching properties from the original pattern and the novel/mismatch matching properties from the fixup pattern, and will therefore be a better match with the actual situation than any of the other abstract patterns that have been tried. The horizontal blend will then be fed to the pattern generation module, and it will serve as a new basis for top-down/bottom-up processing in the perception and action module.

An Operational Description of Another Embodiment of a System of Generating Cognitive Pattern Knowledge:

To understand how the whole CPKG system can work, it is worth stepping through another small example. Suppose that a robot is traversing a trail in the woods and that a twig suddenly gets caught in its tracks. Suppose further that there is no information in LTM about being stuck. What happens?

Suppose that the robot is equipped with a low-level simultaneous localization and mapping (SLAM) system that can act as one of the sensor inputs to the CPKG system. This will probably involve two or more optically independent sensors such as video cameras and laser rangefinders. Before being stuck, the robot is using the normal operational modules: the pattern generation module continues to produce abstract patterns about the trail, its twists and turns, and potential obstacles, and the SLAM system continues to feed location and map features as sensory inputs. The video camera is also a sensory input in its own right, and its data stream is also used for object/path/obstacle recognition. The robot is also equipped with a variety of internal state sensors, such as an accelerometer and a track and wheel motion sensor.

The perception and action module, via several layers of vertical blends, is the component that actually identifies the edges of the trail as well as the objects in the trail that could serve as obstacles. These recognized features of the environment are fed to a human, but because in this example the robot is autonomous, they are also fed to the pattern generation module, which in turn feeds them back to the action portion of the perception and action module. Actions are constructed that will keep the robot on the trail and will keep the robot from avoiding obstacles, and the mid-level perceptual modules provide feedback at just the right level of granularity in order to maintain a path down the center of the trail.

Suddenly, the robot stops moving. This results in unusual data from the accelerometer being fed to the perception-action module. There seems to be no abstract pattern that can match this data, and the anomaly is fed to the adaptation module. The adaptation module interacts with LTM, querying it about robots (objects) that should be moving (temporal properties) but are not (more temporal properties), also querying about potential causes (relations). LTM returns an abstract pattern describing a motionless robot, and, via horizontal blending, creates a horizontal blend from an abstract pattern for the current robot (which should be in motion) and the abstract pattern for the motionless robot, forming a blended abstract pattern for a stuck robot. Among the causes returned from LTM are "robot motor off," "wheels stuck" and "track motion impeded." Since these relations are marked as mutually exclusive, the adaptation module creates for each of them an abstract pattern involving the "stuck robot" blend and one of these causes as a hypothesis to be tested. These abstract patterns are fed to the abstract pattern generator, which feeds them to the perception and action module one at a time. As the "stuck robot" blends work their way down the layers of the perception and action module, each hypothesis is tested. If the robot motor were off, there would be no torque from the motor, so this hypothesis is rejected. If the wheels were stuck, there would be torque from the motor but they would be motionless, so this hypothesis is rejected. If the track motion were impeded, there will be torque from the engine, the wheels will be moving slightly, but the track itself will be motionless. This hypothesis is not rejected. (The hypothesis is not necessarily accepted because additional hypotheses might be entertained and also not rejected.)

By a similar process, LTM may be further queried about additional diagnostics (properties) for the hypotheses that survive, and about remedies (relations) for the survivors of that process. Eventually, an abstract pattern for corrective action will be generated by the pattern generation module and put into play by the perception and action module, and the robot will hopefully be on its way.

Testing Results of One Embodiment of an Ontology for a Knowledge Based System:

For illustration, and not for limitation, the following discussion of testing an operational example of one embodiment of a KBS and CPKG system to assist a group of people to intelligently search, explore, and clear urbanized terrain that includes buildings, streets, and subterranean dwellings. Building clearing tasks are suitable for this system because buildings provide cover and concealment to an enemy and the ability to maintain safe distances, yet acquire precise information on a room by room basis, is important and one way to achieve this is to employ robots that are capable of assisting human operators in performing room clearing procedures.

For testing, two use cases were developed, one using CPKG and one without it. Both use cases consist of two phases. The first phase involves a simulation of three robots performing a room clearing exercise. Each robot is tasked with finding two humans within the simulated environment The second phase of the mission is to guard the first human in a room, once he is found, so that the human does not escape while members of the robot team search for the second human. Once the second human is found, he must be guarded as well.

One goal of this project was to develop a distributed control system for robots that is robust to the loss of functionality of robots or sensors. Accordingly, one of the robots in the use case experiences a laser sensor failure, rendering the robot less capable of intelligently navigating itself through the surrounding environment. The other two robots, in response to the failure, have to assess the situation, consider the mission, and make a choice of what to do about the failing robot. The options included: (1) Leaving the failing robot; (2) Escorting it and having it block and opening (door, window) which would not require it to move and, therefore, could be accomplished with a failed laser; and (3) Escorting the failing robot out.

Importantly, in the use case with CPKG, choice was not based on pre-programmed alternatives but, instead, was based on the robots reasoning over their knowledge of the situation and the mission at hand. In the use case without CPKG, the robots were programmed to just leave the failing robot behind.

Figure 8A:
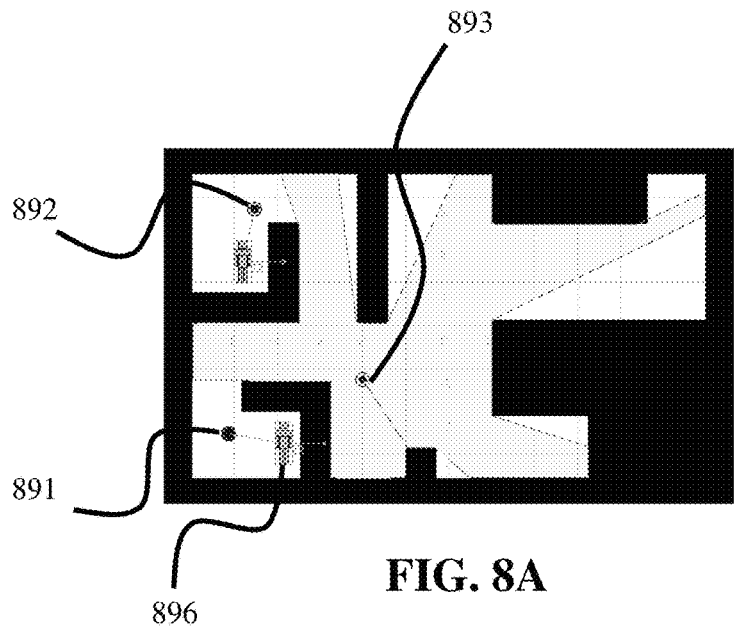
FIGS. 8A and 8B illustrates the physical layout of one test of an embodiment of the systems and methods disclosed.
Figure 8B:
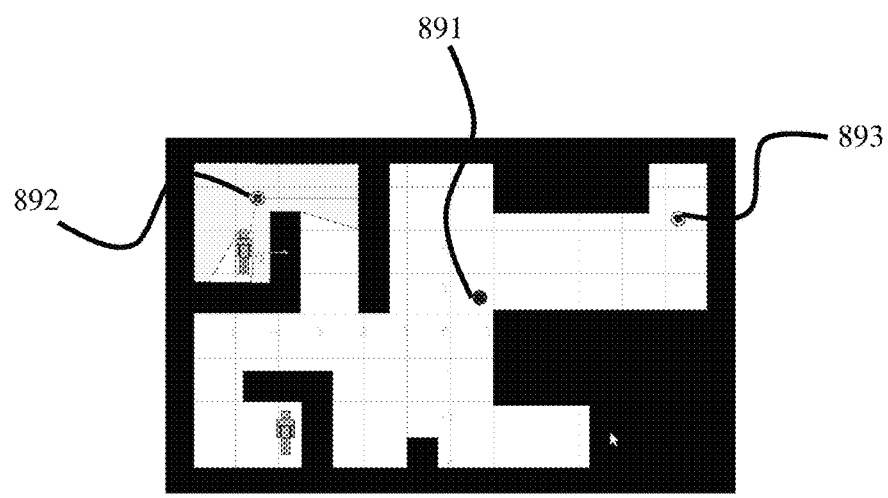

Referring to FIGS. 8A and 8B, in the case with CPKG shown in FIG. 8A, the failing robot 891 (lower left) was escorted and left to guard the first human 896, while the other two robots (892, 893) successfully continued with their mission of looking for more humans. In the use case without CPKG shown in FIG. 8B, the failing robot 891 is left behind making the search take considerably longer because one of the "good" robots 892 has to stand guard instead of continue the search.

In this task, we constructed a technology stack for CPKG that spanned a high-level knowledge layer all the way down to a low-level robot command and sensing layer. At the top was an OWL-based mission ontology, based on technologies of the Semantic Web. Beneath that was a JADE-based agent layer that also contained ontologies (which were automatically populated by the OWL ontologies). Beneath that was a standard robot device driver layer called Player, and that sat on top of a simulated robot layer called Stage. In theory, Stage can be replaced by actual robots and the system should work, though in practice integrating physical robots into the system takes considerable extra work.

Figure 9:
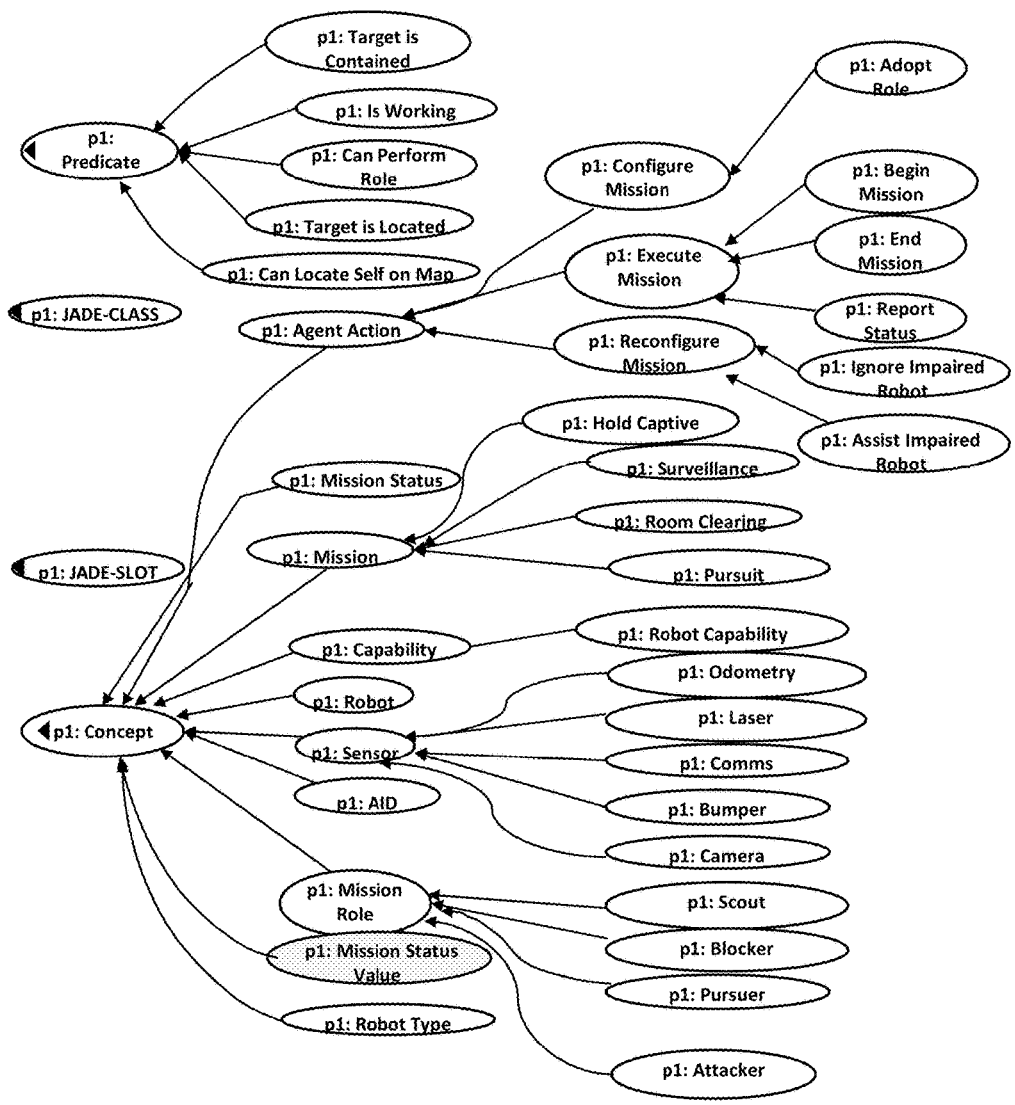
FIG. 9 illustrates one embodiment of an ontology.

Ontology (JADE, OWL):

Ontologies are a standard way of representing and, to some extent, inferring knowledge. The ontology developed for Cognitive Patterns (see FIG. 9) accommodates a wide range of facets such as the number and type of sensors required to complete the mission, the number and type of robots needed to complete the mission, as well as the nature of the mission: explore, track, guard, etc.

In this test, we focused on a single aspect of the mission ontology—whether all the known targets have been located by the robots and whether the targets were guarded by the robots, once they were discovered. The total number of targets was assumed to be known a priori, as is the map of the place, in order to assist robots with navigation.

In this test, we implemented the ontology the Web Ontology Language OWL, a standard ontology language [http://www.w3.org/2004/OWL]. OWL is an important component of knowledge representation and is utilized in many military systems. It is a W3C recommendation (i.e. ratified by the World Wide Web Consortium) and it grew out of a DARPA project called DAML+OIL and incorporates lessons learned from the design and application of DAML+OIL. OWL permits rich logical definitions and inferences. There are a number of existing tools available to work with OWL-based ontologies. This is the locus of mission, mission status, environmental, and other contextual knowledge to be used by the agents.

Distributed Agent-Based System (JADE):

In CPKG, agents will use ontology or another knowledge-based system to determine their behavior and command the robots via an interface to the robot driver, Player. The intent is to have one agent per robot and one additional planner agent. The planner will instruct the robot agents which way points to explore and which robots will assist the disabled robots.

Robot agents in CPKG are implemented in JADE (Java Agent DEvelopment Framework) [http://jade.cselt.it], which provides distributed agent services such as communication, status update, and other user-written functionality. These robots have a series of capabilities that each robot agent is capable of performing, such as going to a point, assisting another robot, relaying its location, asserting that it has a disabled sensor, informing that it has found an enemy entity. The planner agent is capable of directing a robot to explore a point and directing one robot to assist a disabled robot.

The planner uses the ontology to reason about the mission, that is, whether it has located all known targets. It then determines whether it should continue with the mission and whether it should direct functional robots to assist disabled robots or abandon them.

In order to represent our ontology, we used a tool that accepts OWL ontologies as input and generates Java skeleton code for a Jade ontology. This allows the objects of ontology to be represented and manipulated as ordinary java objects. This helps to encapsulate the knowledge representation and reasoning layer and will make the transition to a less brittle and more powerful knowledge representation and reasoning scheme simpler.

In version one of the room-clearing mission with a single enemy entity, functional robots were not directed to aid disabled robots unless the enemy had been detected. This favors exploratory behavior over cohesion.

In version two of the room-clearing mission with multiple enemy entities, functional robots were immediately directed to assist disabled robots in getting to an opening where the disabled robots could guard the humans that have been found. The functional robots then continued searching when they encountered an enemy entity, or would guard if there were no disabled robots in tow. This version is more robust than the version described above.

Player and Stage:

In this test, the prototype was limited to simulations as well as implementing CPKG on three physical robots. These were iRobot Creates®, as described below.

Player is a robot server with drivers compatible with iRobot Creates as well as with the lasers and cameras with which these robots will be equipped. One of the benefits of this configuration is that it can be used for a simulated environment such as Stage [http://playerstage.sourceforge.net] or for actual robots, with minimal changes.

The player/stage system employs a client-server architecture that offers a level of abstraction for dealing with mobile robots and sensor hardware. We built a Java library that encapsulates this functionality in order to decouple higher-level code from the lower level details of controlling the robot.

The 'Player' software is a network server that provides an interface for communicating with a robot's sensors and actuators over a TCP/IP socket. In most situations the server runs directly on the robot. By employing a proxy system for individual drivers, such as a laser rangefinder or bumper switch, a client program can access the proxy sensor's data (provided by a Player server) without needing to know what specific model or brand of hardware is actually being used. This allows a client program to be hardware and robot agnostic. Pieces of hardware or entire robots could be easily exchanged for others without having to rewrite any of your robot's control code, as long as any substitute robot is capable of exposing the same interfaces (i.e. it has a laser or bumper—whatever your application requires).

The 'Stage' software is a two-dimensional simulation environment capable of providing simulated drivers to a player server—allowing users to test their algorithms without the need for real and often expensive hardware.

The software stack was slightly modified in this test. Instead of using Player (without the Stage simulator) for our backend software stack, we've opted to use a new robotics framework developed by Stanford University called ROS or the Robotic Operating System. Although under heavy development, ROS (1) provides flexibility for developing, visualizing, and debugging software, and (2) it is more likely to evolve than is Player, because ROS recently hired the lead developer of Player. Leveraging ROS will help future-proof our efforts, so they can stay up to date with the latest available software from the ROS framework.

Although this invention has been described in the above forms with a certain degree of particularity, it is understood that the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention which is defined in the claims and their equivalents.

We claim:

1. A processor based method of generating a new pattern knowledge for a processor based device, said method comprising the steps of:
    receiving at least one concrete pattern representing a sensory input from an electronic sensor;
    receiving at least one abstract pattern representing a pattern knowledge of a processor based device;
    the pattern knowledge stored in a memory of the processor based device;
    vertically blending the concrete pattern with the abstract pattern to create a vertically blended pattern whereby the vertically blended pattern represents a new pattern knowledge of the processor based device;
    determining a measure of a degree of vertical blending;
    when the measure of the degree of vertical blending exceeds a threshold, horizontally blending at least two abstract patterns to create a horizontally blended abstract pattern as the new pattern knowledge;
    determining an action for the processor based device based on the new pattern knowledge wherein the action is to move the processor based device and receive a second concrete pattern; and
    executing the action by moving the processor based device and receiving the second concrete pattern representing a second sensory input from the electronic sensor.

2. The processor based method of claim 1 further comprising translating the sensory input into one or more parameter wherein the concrete pattern comprises at least one of the one or more parameter of the sensory input from the electronic sensor.

3. The processor based method of claim 1 wherein the abstract pattern comprises one or more parameter of the pattern knowledge representing a relevant abstract pattern.

4. The processor based method of claim 1 wherein the processor based device is an autonomous device.

5. The processor based method of claim 1 wherein the vertically blending comprises selectively projecting a parameter of the abstract pattern with a parameter of the concrete pattern.

6. The processor based method of claim 1 wherein:
    the processor based device is an autonomous device;
    the action further comprises storing the new pattern knowledge in the memory of the processor based device; and
    after storing the new pattern knowledge in the memory:
        receiving the second concrete pattern representing a second sensory input from the electronic sensor,
        receiving at least one second abstract pattern from the memory of the processor based device representing the pattern knowledge of the processor based device, the at least one second abstract pattern comprising the new pattern knowledge of the processor based device,
        vertically blending the second concrete pattern with the at least one second abstract pattern to create a second vertically blended pattern whereby the second vertically blended pattern represents a second new pattern knowledge of the processor based device, and
        storing the second new pattern knowledge in the memory of the processor based device.

7. The processor based method of claim 1 wherein:
    the step of vertically blending the concrete pattern with the abstract pattern occurs when the measure of the degree of vertical blending is less than the threshold.

8. The processor based method of claim 7 wherein:
    the vertically blending comprises selectively projecting a parameter of the abstract pattern with a parameter of the concrete pattern as a parameter of the new pattern knowledge; and
    the horizontally blended abstract pattern is created by selectively projecting at least one abstract parameter from the at least two abstract patterns as a parameter of the new pattern knowledge.

9. The processor based method claim 1 wherein exceeding the threshold of the measure of the degree of vertical blending reflects a poor match by vertical blending.

10. A processor based cognitive pattern knowledge generating system for generating a new pattern knowledge for a processor based device, said system comprising:
   a pattern generation module configured to generate an abstract pattern from a pattern knowledge in a memory and to receive a concrete pattern representing a sensory input from an electronic sensor;
   a perception and action module configured to vertically blend the abstract pattern and the concrete pattern to create a vertically blended abstract pattern whereby the vertically blended abstract pattern represents a new pattern knowledge of a processor based device;
   an adaptation module configured to horizontally blend at least two abstract patterns to create a horizontally blended abstract pattern as the new pattern knowledge when a measure of a degree of vertical blending exceeds a threshold;
   a perception and action module configured to determine an action for the processor based device based on the new pattern knowledge wherein the action is to move the processor based device and receive a second concrete pattern; and
   the processor based device configured to execute the action by moving the processor based device and receiving the second concrete pattern representing a second sensory input from the electronic sensor.

11. The processor based cognitive pattern knowledge generating system of claim 10 further comprising a perceptual module configured to translate the sensory input into one or more parameter wherein the concrete pattern comprises at least one of the one or more parameter.

12. The processor based cognitive pattern knowledge generating system of claim 10 wherein the abstract pattern comprises one or more parameter representing a relevant abstract pattern.

13. The processor based cognitive pattern knowledge generating system of claim 10 wherein the abstract pattern comprises one or more parameter communicated from a long-term memory.

14. The processor based cognitive pattern knowledge generating system of claim 10 wherein the pattern knowledge is use to provide an action from an effector of the processor based device.

15. The processor based cognitive pattern knowledge generating system of claim 10 wherein the vertically blended abstract pattern is communicated to a memory as a new abstract pattern.

16. The processor based cognitive pattern knowledge generating system of claim 10 wherein the horizontally blended abstract pattern is communicated to a memory as a new abstract pattern.

17. A processor based cognitive pattern knowledge generating system for generating a new pattern knowledge for a processor based device, said system configured to carry out a method of generating a new pattern knowledge, the method comprising:
   receiving at least one concrete pattern representing a sensory input from an electronic sensor;
   receiving at least one abstract pattern comprising a pattern knowledge of a processor based device;
   vertically blending the concrete pattern with the abstract pattern to create a vertically blended pattern whereby the vertically blended pattern represents a new pattern knowledge of the processor based device;
   determining a measure of a degree of vertical blending;
   when the measure of the degree of vertical blending exceeds a threshold, horizontally blending at least two abstract patterns to create a horizontally blended abstract pattern as the new pattern knowledge;
   storing the new pattern knowledge in a memory as one of the at least one abstract pattern; and
   executing an action to move the processor based device and receive a second concrete pattern representing a second sensory input from the electronic sensor.

18. The processor based cognitive pattern knowledge generating system of claim 17 wherein the method further comprises translating the sensory input into one or more parameter wherein the concrete pattern comprises at least one of the one or more parameter.

19. The processor based cognitive pattern knowledge generating system of claim 17 wherein the abstract pattern comprises one or more parameter representing a relevant abstract pattern.

20. The processor based cognitive pattern knowledge generating system of claim 17 wherein:
   the step of vertically blending the concrete pattern with the abstract pattern occurs when the measure of the degree of vertical blending is less than the threshold.

* * * * *